United States Patent [19]
Yang et al.

[11] Patent Number: 5,753,879
[45] Date of Patent: May 19, 1998

[54] SELF-SPINNING ELECTRO-SPARK LINEAR CUTTING MACHINE

[76] Inventors: Xinsheng Yang; Lilin Xu, both of Huangmugang west 4-101, Shenzhen 518001, China

[21] Appl. No.: 648,044
[22] PCT Filed: Nov. 18, 1994
[86] PCT No.: PCT/CN94/00093
 § 371 Date: Jun. 13, 1996
 § 102(e) Date: Jun. 13, 1996
[87] PCT Pub. No.: WO95/13895
 PCT Pub. Date: May 26, 1995

[30] Foreign Application Priority Data

Nov. 18, 1993 [CN] China .............. 93 2 45117.9

[51] Int. Cl.[6] ........................................... B23H 7/10
[52] U.S. Cl. ............................................... 219/69.12
[58] Field of Search .................. 219/69.12; 204/224 M

[56] References Cited

U.S. PATENT DOCUMENTS 5,506,382  4/1996  Derighetti ................. 219/69.12

FOREIGN PATENT DOCUMENTS

| | | |
|---|---|---|
| 0585715 | 3/1994 | European Pat. Off. . |
| 56-119325 | 9/1981 | Japan . |
| 59-110515 | 6/1984 | Japan ................. 219/69.12 |
| 62-157726 | 7/1987 | Japan . |
| 62-224525 | 10/1987 | Japan . |
| 63-174818 | 7/1988 | Japan ................. 219/69.12 |
| 5-337744 | 12/1993 | Japan ................. 219/69.12 |

*Primary Examiner*—Geoffrey S. Evans
*Attorney, Agent, or Firm*—Ladas & Parry

[57] ABSTRACT

A self-spinning electro-spark linear cutting machine includes a main body having a working table, a power box and a control system, an emulsion box and at least one wire traveling device that operates the electrode wire in a high speed rotation, while making a linear movement. The wire traveling device includes a main shaft, a wire spool coaxially mounted on and rotable about the main shaft, and speed transformation gears driven by the main shaft and coupled for driving the wire spool to rotate coaxially in the same direction but at a different speed with the main shaft.

6 Claims, 4 Drawing Sheets

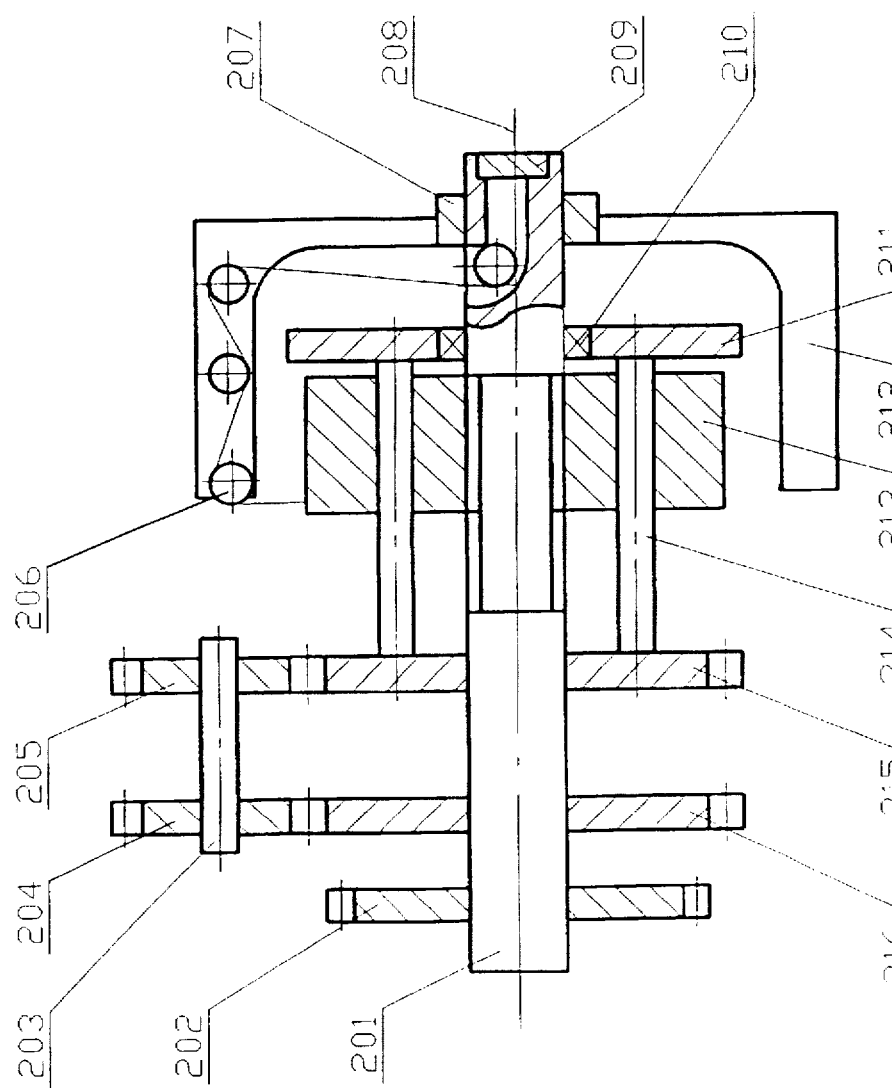

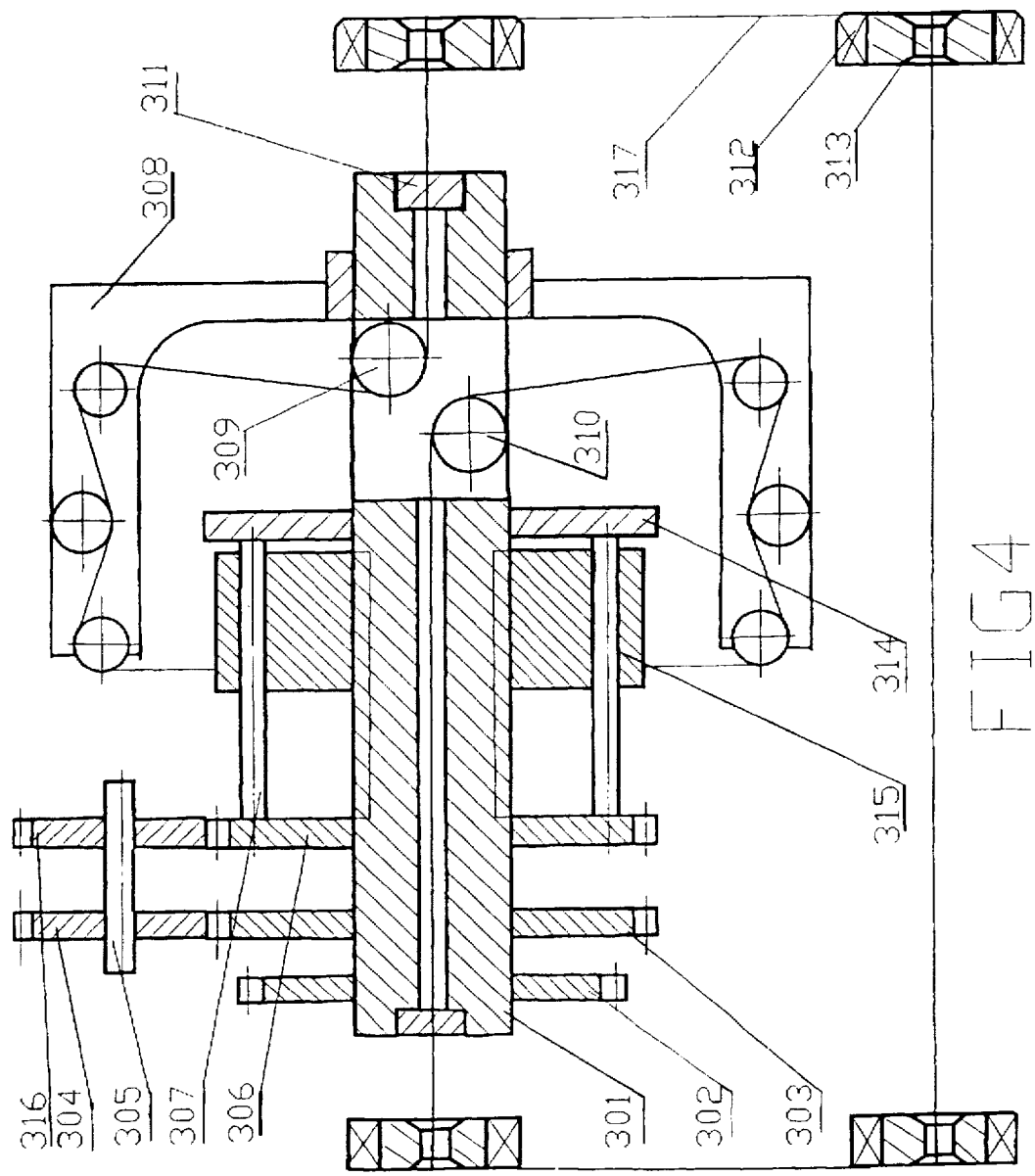

SELF-SPINNING ELECTRO-SPARK LINEAR CUTTING MACHINE

TECHNICAL FIELD

The present invention relates to an electro-spark linear cutting machine, more particularly, to a self-spinning electro-spark linear cutting machine with large cutting range, high precision and high efficiency.

BACKGROUND ART

There are two types of conventional electro-spark linear cutting machine: one is of quick electrode wire traveling, whose speed is 6–12 meter/sec., and the other is of slow electrode wire traveling, whose speed is ≦250 mm/sec. The former has a high speed wire traveling, its chip removal is easier, the cutting speed is higher and can be used for cutting thicker workpiece, but its vibration is heavier, and also, its electrode wire is made of costly molybdenum, so it must be repeatedly used in to-and-fro movement, that leads to unilateral discharge and electrode wire distortion and in turn causes lower working precision and rougher working surface. Since the to-and-fro movement is very quick and the working time for one single trip is short (normally 10 to 20 sec. ), direction-change must be frequently made, but direction-change can leave marks on the working surface due to the working conditions change when direction-changing, that seriously influences the working surface fineness. The latter uses copper wire as its electrode wire which can be used only once, the working precision is high and the working surface fineness is much more improved, but its electrode wire traveling is slow and its chip removal is difficult, that have a serious effect on the workpiece permissible thickness and working speed, and also, in order to avoid wire breaking caused by pulling arc, the working precision of wire traveling device must be very high, that leads to the high cost of machine. Meanwhile, the wire can only be used once, that is a big waste.

Furthermore, the above two conventional linear cutting machines have one unsolvable common drawback, that is, the electrode wire, in both cases, moves from one end of the workpiece to the other, and the chip removal is also done from one end to the other, so with the thickness of the workpiece increasing, the chip removal path becomes longer. The thicker the workpiece is, the more difficult the chip removal is. It is likely to cause unstable working of the machine so that the wire breaks, and it is impossible to cut thicker workpiece. 400 mm is the maximum thickness of workpiece which can be cut by the various types of linear cutting machine available on the market.

DISCLOSURE OF THE INVENTION

The object of the present invention is to provide a new type of electro-spark linear cutting machine which can thoroughly overcome the above weakpoints of the conventional machines, namely slow speed, low precision and rough surface. The chip removal process is thoroughly changed through changing the mode of wire traveling of the conventional electrode wire traveling devices, namely, changing the mode of wire movement, by which the workpiece electro-spark cutting is achieved, from making a single linear movement to a combined movement—the wire moves linearly and at the same time rotates about its own axis at a high speed. This movement causes the process of chip removal to be thoroughly changed—the chip will be removed to the aft of working surface instead of to one end of workpiece, and the rate of chip removal will only depend on the rotation rate, not the workpiece thickness. Thus, the problem, that cutting thicker workpieces causes more difficulties and whereby makes the working performance degraded so that it is impossible to cut during the working process when using the conventional machines, is radically resolved, and the cutting thickness is greatly increased, the working is stable and the working speed is raised.

Another object of the invention is to provide a self-spinning linear cutting machine which has high linear cutting performance, one unit of which can be used for multipurpose because of electrode rotation itself further having a function of digital control grinding and which also has a simple structure and low manufacture cost.

A self-spinning linear cutting machine according to the present invention comprises a main body, a power box of control system for providing impulse power and all the control signals to the main body including the display, and an emulsion box for providing emulsion to the emulsion circulation circuit which passes through cutting workpiece in the working area of said main body; said main body comprises a working table which can be controlled by control signals to make two or multi-dimension movements and a wire traveling device which provides the motion of electro-spark electrode wire across said working table, the electrode wire of said wire trading device being capable of making a high speed self-spinning while making a linear movement.

In a self-spinning linear cutting machine according to the present invention, the wire traveling device comprises a main shaft, a wire arranging device, a wire spool and a speed transformation device. One portion of said electrode wire passes through the center of said main shaft and a drum connected with the main shaft, and is wound around said wire spool to rotate at the same high speed as that of the main shaft. The other portion of said electrode wire crosses the working area of the working table, passes through the center of the other main shaft or the other end of the same main shaft and the drum associated with the shaft and is wound around the other wire spool or around the same wire spool but in the contrary direction, whereby the wire spools and the main shafts are allowed to rotate about the same axis, by maintaining the ratio between the rotation rates of the wire spool and the main shaft (keep the ratio constant), said wire arranging device is adapted to make the electrode wire be wound around said wire spool sequentially and orderly during the electrode wire moving.

A self-spinning electro-spark linear cutting machine according to the first embodiment of the present invention comprises a base, a guide track of left upright column, a guide track of right upright column, a working table, a left main shaft horizontally installed on the right side of the left upright column, a right main shaft horizontally installed on the left side of the right upright column, an electrode wire movable between said left and right upright columns, a wire arranging device and a speed transformation device wherein said wire arranging device comprises a big drum connected with said main shaft, 4 guide wheels installed on said big drum over which said electrode wire passes sequentially and a linking board idlely sleeved on said main shaft and connected with the wire spools, a driven gear and a bracket, the linking board making a horizontal linear movement in parallel with said main shaft via a screw rod and a nut; said speed transformation device comprises a long gear fixed on the main shaft, a driven gear connected with the wire spool, a small shaft connected with a first middle gear at one end which is engaged with said long gear and a second middle gear at the other end which is engaged with said driven gear;

the wire spool and the main shaft are allowed to rotate around the same axis, in the same direction but with a constant ratio between their rotation rates by properly selecting the tooth number of each gear.

A self-spinning electro-spark linear cutting machine according to the second embodiment of the present invention comprises a base, a guide track of left upright column, a guide track of right upright column, a working table, a left main shaft horizontally installed on the right side of the left upright column, a right main shaft horizontally installed on the left side of the right upright column, an electrode wire which moves between said two main shafts a synchronous gear coupled between a motor and said shaft, a wire arranging device and a speed transformation device, wherein said wire arranging device comprises a small drum, 4 guide wheels installed on said small drum over which said electrode wire passes sequentially, a support plate sleeved on the main shaft, a driven gear connected with said support plate via bolts, and said bolts are also slidingly connected with said driven gear; the speed transformation device comprises a driving gear fixed on the main shaft, a first middle gear engaged with said driving gear, a second middle gear engaged with said driven gear, a bridge shaft two ends of which are connected with said two middle gears; said wire spool and said main shaft are allowed to rotate a round the same axis, in the same direction but with a constant ration between their rotation rates by properly selecting the tooth number of each gear; one portion of said m a in shaft is formed to be a screw rod and there is a female screw inside the bore of the wire spool, and since there exists a relative movement between the main s haft and wire spool, said wire spool can make a reciprocating linear movement on said main shaft.

A self-spinning electro-spark linear cutting machine according to the third embodiment of the invention comprises a base, a guide track of a single upright column, a working table, a wire traveling device installed on said single upright column, an electrode wire passing through bearings and sleeve guides inside the bearings and moving under said wire traveling device, a main shaft equipped with a gem sleeve guide at its one end, a motor driving said main shaft via a synchronous gear, a wire arranging device and a speed transformation device, wherein said wire arranging device comprises a small drum connected with said main shaft, 4 guide wheels installed in upper part of said small drum over which said electrode wire passes sequentially and a support plate sleeved on said main shaft; said wire spool is slidingly connected with bolts and installed between said gear and said support plate; said electrode wire, released from said wire spool, passes through said guide wheels on the upper part of said small drum, another guide wheel installed at one end of said main shaft, said gem sleeve guide of said main shaft and bearings and their sleeve guide members on both sides of the working area, enters the inner hole of said main shaft from its other end and then passes over said an other guide wheel on the main shaft and the guide wheels installed on the lower part of said small drum to return to the wire spool; said wire spool makes reciprocating movement on said main shaft through a screw rod and a nut; said speed transformation device includes a driving gear fixed on said main shaft, a driven gear idlely sleeved on said main shaft, a first and a second middle gears respectively engaged with said gears and a bridge shaft connected between said gears; said wire spool and main shaft are allowed to rotate around the same axis, in the same direction but with a constant ratio between their rotation rates by properly selecting the tooth number of each gear.

In a self-spinning electro-spark linear cutting machine according to the present invention, the stop time of the pulse power in said power box of control system is very short, so the duty retio can be less than 10%.

In the embodiment of the self-spinning electro-spark linear cutting machine provided by the present invention, since the electrode wire is arranged to make both linear and rotational movement, the performance of the whole unit can achieve the effects as follows: 1. Workpieces with great thickness can be cut. 2. Working speed is increased because the duty ratio is significantly increased. 3. Working stability and precision are improved to make cutting surface smoother because the chip is removed on the whole cutting surface in parallel instead of at the ends in series. 4. The electrode wire distortion caused by unilateral discharge can be avoided. 5. The taper cutting can be easily achieved because the electrode wire is horizontally disposed. 6. The structure by which the combined movement of the electrode wire is achieved is simple and reasonable, the cost is not increased, the efficiency of the whole unit is much more increased and the unit also have a digital control grinding function to be used for multi-purposes.

BRIEF DESCRIPTION OF THE DRAWINGS

FIG. 3 is a schematic diagram of the structure of the wire traveling device of the second preferred embodiment of the present invention;

FIG. 4 is a schematic diagram of the structure of the traveling device of the third preferred embodiment of the present invention.

BEST MODES FOR CARRYING OUT THE INVENTION

Figure 1:
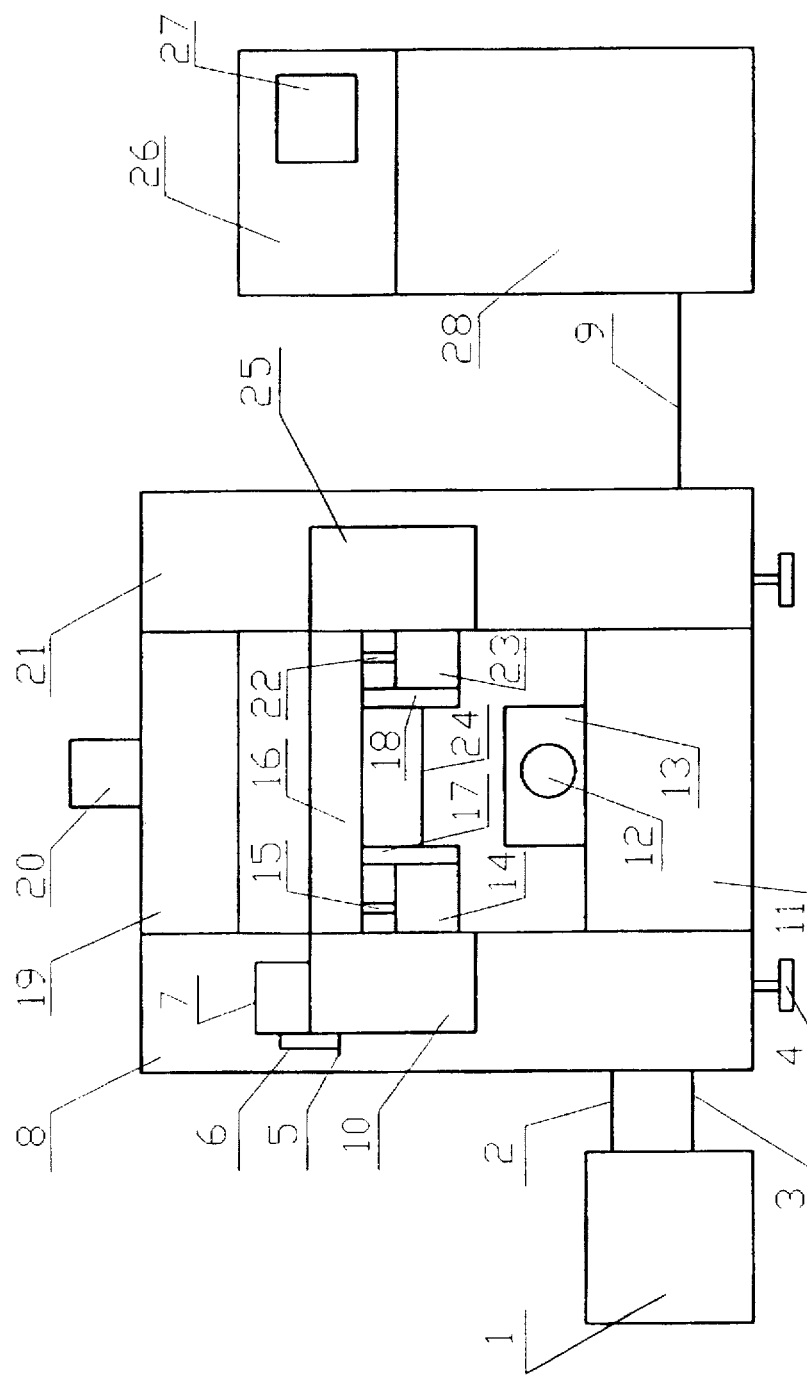
FIG. 1 is a schematic diagram of the structure of a self-spinning electro-spark linear cutting machine according to the present invention.

A self-spinning electro-spark linear cutting machine according to the present invention can be of two-dimension, as shown in FIG. 1, but also can be of 4 or 5-dimension. The two-dimension self-spinning linear cutting machine includes three portions: the first portion is an emulsion tank, the second portion is a power box for control system and the third portion is a main body. A high pressure pump installed in the emulsion box 1, during operation, supplies the emulsion to the working area in the main body via discharge line 2, then the emulsion collected by a trough returns to the emulsion box via return line 3, and having been filtered, flows to the operating area of the high pressure pump. The power box for control system includes a computer, a control circuit 26, an impulse power 28 and operating panel. The computer fulfills the work of controlling and regulating the whole machine through the control circuit 26, including programming, plotting, displaying, working status monitoring, Y-axis and Z-axis digital control, clockwise and counterclockwise rotations of the main motor 7 and con trolling various security performance. The discharge impulses of the impulse power 28 can be freely chosed through the operating panel to achieve rough, normal and precise cuttings.

The main body includes a base 11, a guide track of left upright column 8, a guide track of right upright column 21, working tables 12 and 13, wire traveling brackets 10, 16, 25, 17, 18 and wire traveling devices 14, 15, 22, 23 and 24. The wire traveling brackets and the wire traveling devices are allowed to make a synchronous movement on the left and right guide tracks by the Z-axis motor 20 and the working table 13 is allowed to move back and forth on the base 11 by Y-axis motor to achieve two-dimension working. A synchronous connecting smooth rod 5 is rotated by the main motor 7 via a V-belt 6, and by means of synchronous action of the left and right traveling devices 14 and 23, the electrode wire is thus allowed to make a high speed rotation while making a reciprocating linear movement.

Figure 2:
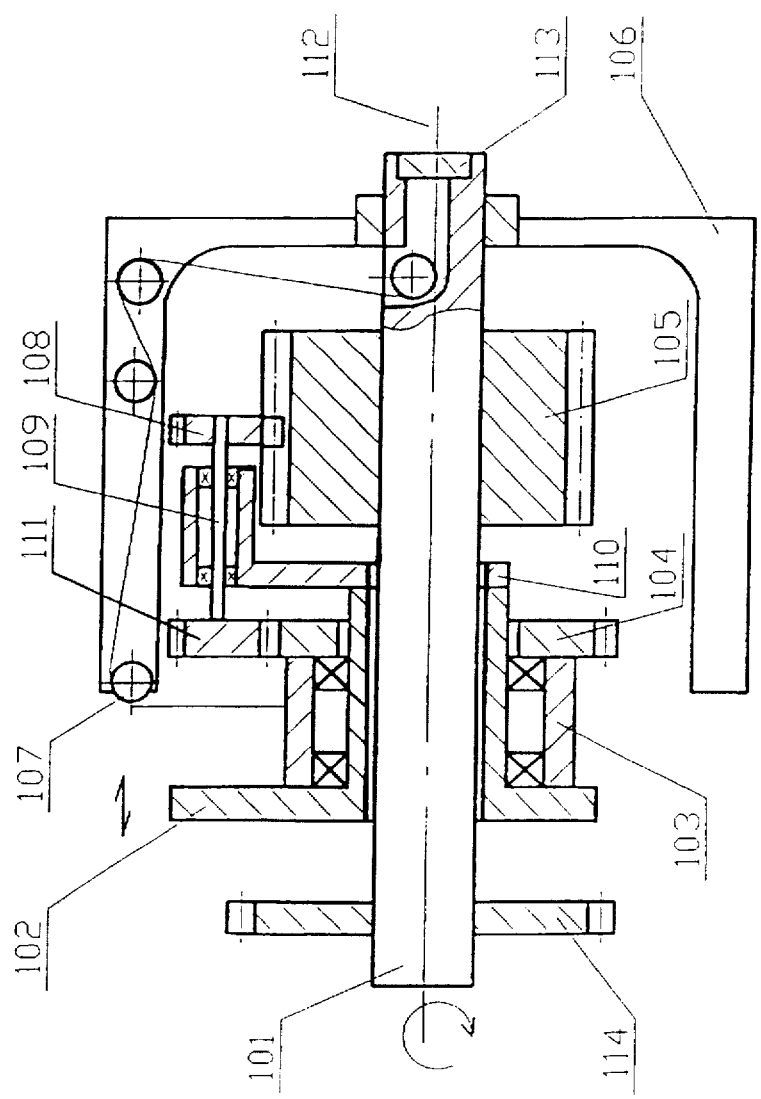
FIG. 2 is a schematic diagram of the structure of the wire traveling device of the first preferred embodiment of the present invention.

In the first preferred embodiment of the present invention shown in FIG. 2, it only shows the detailed structure of the wire traveling device on the left upright column of a complete self-spinning electro-spark linear cutting machine shown in FIG. 1. In FIG. 1, the wire traveling devices installed on the guide tracks of right upright column and left upright column are exactly symmetrical and both of them are driven by the motor 7. When the wire moves linearly during making electro-spark linear cutting on the workpiece, if the wire is given out by the wire traveling device on the left upright column, it must be taken in by the wire traveling device on the right upright column.

This wire traveling device, as shown in FIG. 2, comprises a main shaft 101, a linking board 102, a wire spool 103, a driven gear 104, a long gear 105, a big drum 106, a guide wheel 107, a first middle gear 108, a small shaft 109, a bracket 110, a second middle gear 111, a electrode wire 112, a gem guide sleeve 113 and a pulley 114. The motor, when operating, drives the main shaft 101 to rotate at a high rate via the pulley 114; at the same time, the long gear fixed on the main shaft rotates with the main shaft in the same manner and makes the gear 111 rotate in the opposite direction via the first middle gear 108 and the small shaft 109; and the gear 111 drives the driven gear 104 which is connected with the wire spool 103. Therefore the wire spool 103 and the main shaft 101 can rotate in the same direction. By properly determining the tooth numbers of the gears 105, 108, 111 and 104, the wire spool 103 and the main shaft 101 can rotate in the same direction but with different rates. The big drum 106, complied with the main shaft 101, now rotates with the wire spool 103 in the same direction, about the same axis but with different rates. The electrode wire 112 rotates along with the big drum 106 over four guide wheels 107, which causes the electrode wire spinning. Furthermore, the wire spool 103, the gear 104 and the bracket 110 are connected with the linking board 102, and the linking board 102 is allowed to move linearly to the left and right by means of a screw rod and a nut. All above in summary, since the big drum 106 and the wire spool 103 make asynchronous movements in the same direction, if the rate of the big drum 106 is higher than the rate of the wire spool 103, the wire will be wound around the wire spool when their movements are in the wire winding direction, otherwise the wire will be released. At the same time, the wire spool 103 moves linearly by means of the linking board 102, it is accordingly to achieve two types of movement for wire winding (and releasing) and wire arranging. Therefore the combined movement of both rotation and reciprocating linear motion of the wire 112 can be achieved by such two symmetrically disposed devices. The gem sleeve guide mounted at one end of the main shaft serves the function of positioning and guiding.

In the first preferred embodiment, when the tooth number of the long gear 105 is 44, the tooth number of he gear 108 is 32, the tooth number of the gear 111 is 31 and the tooth number of the gear 104 is 45, the differential transmission ratio will be (44×31)/(45×32). Meanwhile, the gear box is driven by the machine motor as to drive the screw rod to cause the reduction ratio between the main shaft and the screw rod to be 1:100, thus the wire arranging can be achieved.

Moreover, because the wire traveling device of the machine in this embodiment is horizontally disposed, and the conventional X and Y axes digital controls are changed into the Y and Z axes digital control and because the chip removal is easy and the working is stable, the power and the base portions can be improved correspondingly. The stop time of the power can be reduced. The structure of the machine can be improved in the light of planer structure, see FIG. 1.

The structure of the first preferred embodiment is also suitable to the self-spinning linear cutting machine with a double-head small drum type of wire traveling device.

Similarly to FIG. 2, FIG. 3 only shows a schematic diagram of the detailed structure of the wire traveling device on the guide track 8 of the left upright column of a complete self-spinning electro-spark linear cutting machine in the second preferred embodiment. The wire traveling device on the right upright column 21 is completely symmetrical to that shown in FIG. 3.

The wire traveling device shown in FIG. 3 comprises a main shaft 201, a synchronous gear 202, a bridge shaft 203, a first and second middle gears 204 and 205, a guide wheel 206, a small drum 207, an electrode wire 208, a gem sleeve guide 209, a support plate 211, a small drum 212, a wire spool 213, bolts 214, a driving gear 216 and a driven gear 215. The motor, when operating, drives the main shaft 201 to rotate at a high rate via the synchronous gear 202. The driving gear 216 fixed on the main shaft 201 rotates along with the main shaft; the driven gear 215 makes an asynchronous rotation in the same direction with the main shaft via the gear 204 and the bridge shaft 203; the wire spool 213 is connected with the driven gear 215 via the bolt 214, so the wire spool makes the same rotation as the gear 215 does. Since there exists a rate difference between the main shaft 201 and the wire spool, the wire spool, via the nut, is able to make a reciprocating linear movement. The wire rotates along with the small drum 212 over the 4 guide wheels 206. Since the small drum 212 is connected with the main shaft 201, the small drum 212 and the wire spool 213 make asynchronous rotation in the same direction. If the wire winding direction and the spool rotating direction are the same, the wire will be wound around the wire spool when the rotation rate of the small drum 212 is higher than that of the wire spool, otherwise the wire will be released. If the tooth number of the gear 216 is 92, the tooth number of the gear 204 is 90 and the module is 1.5; the tooth number of the gear 205 is 77, the tooth number of the gear 215 is 79 and the module is 1.75, the differential transmission ratio will be (92×77)/ (90×79), and if the pitch of the screw rod is 0.5 mm, the wire winding and arranging can be achieved. Gears having different modules can be used to form a set. If the module difference is small, the optimum engagement range of gears suitable to this device can be calculated. For example, when the main shaft rate is 2000 rpm, the wire spool length is 80 mm, the working time of a single wire trip reaches 21.9 minutes, this makes the direction-changing frequency significantly decreased.

The other parts of structure of this embodiment are the same as those of the first embodiment.

FIG. 4 shows the third preferred embodiment. The difference between this embodiment and above two embodiments lies in: a guide track on a single upright column, and an associated base, a working table and a wire traveling device installed on the single upright column guide track are adopted, and the electrode wire is the electrode wire 317 which passes through and moves in two groups of bearings and inner sleeve guides inside the bearings 312, 313 under said wire traveling device and across the working table grown side to side. In FIG. 4, 301 is a main shaft, 302 is a synchronous gear, 303 is a driving gear, 304 is the first middle gear, 305 is a bridge shaft, 306 is a driven gear, 307 is a bolt, 308 is a small drum, 309 and 310 are a guide wheels, 311 is a gem sleeve guide, 312 is a bearing, 313 is a sleeve guide inside the bearing, 314 is a support plate, 315 is a wire spool and 316 is the second middle gear. The motor, when operating, drives the main shaft 301 to rotate at a high rate through the synchronous gear 302. The driving gear 303 is fixed on the main shaft 301 and so rotates along with the main shaft. The driven gear 306 makes an asynchronous rotation with the main shaft but in the same direction via the gear 304, the bridge shaft 305 and the second middle gear 316. The spool 315 is connected with the driven gear 306 through the bold 307 and so makes the same rotation as the driven gear 306 does. Since there exists a difference between the rotation rates of the main shaft 301 and the spool 315, the wire spool makes a reciprocating linear movement through the nut. One end of said electrode wire is connected with the small drum 308 via the 4 guide wheels in the upper part of the drum, whereby the wire makes the same rotation as the main shaft does. When the rotation direction of the wire on the upper wire part of the drum is arranged to be contrary to the wire rotation direction of the lower part of the drum on the same wire spool, there must be wire winding at one end of the wire and wire releasing at the other end, no matter the main shaft rotates in which direction. Likewise, the wire spool can make a reciprocating linear movement and so the electrode wire 317 can be caused to make a reciprocating linear movement while making a high rate rotation. The bearing brackets 312 and 313 serve the function of passive rotation and changing the wire traveling direction.

This embodiment is suitable to a linear cutting machine having a single upright column and a small drum. The other parts of structure of this embodiment are the same as those of the first embodiment.

As described above, the wire traveling device of a self-spinning electro-spark linear cutting machine according to he present invention, no matter is of double upright columns or a single upright column, provides three types of movement: the first is that the electrode wire makes a horizontal reciprocating linear movement; the second is that the electrode wire makes a high rate self-spinning when moving horizontally and linearly, which is the most important factor that the present invention particularly has and which can improve the cutting performance and increase the cutting efficiency; the third is that the rotation which the wire spool needs for arranging and winding the wire and the wire must be arranged orderly, sequentially and without twist. The second movement above-noted, namely the high rate roatation of the main shaft, and the third movement are rotations about the same axis, in the same direction and with a constant ratio between the different rates. This design allows the wire traveling device according to the present invention to use only one motor for driving, and by means of ingenious transmission mechanism, the above three types of movement is in a combination, simultaneously achieving that the first movement becomes the result of the second and the third movements above-noted.

What is claimed is:

1. A self-spinning electro-spark linear cutting machine, comprising a main body, a power box for providing impulse power to the main body, a control system for providing control signals to the main body, and an emulsion box for providing emulsion to an emulsion circulation circuit which passes through a workpiece in a working area of said main body, said main body including a working table which is controllable by the control signals to make two or multi-dimension movements and at least one wire traveling device which enables an electro-spark electrode wire to move linearly across said working table and rotate about the wire's own axis at a high speed, and which uniformly releases and rewinds the wire, wherein said wire traveling device comprises a main shaft having an axis in the same direction of and coinciding with the axis of the wire traveling across the working table, a wire arranging means having a wire spool being coaxially mounted on and rotatable about said main shaft, and a speed transformation means driven by said main shaft and coupled for driving said wire spool to rotate coaxially in the same direction but at a different speed with said main shaft.

2. The machine as a claimed in claim 1, wherein another wire traveling device is symmetrically arranged with said one wire traveling device on both sides of said working table, and said wire released from the wire spool of said one wire traveling device comes out from an axial central hole of the main shaft of said one wire traveling device, travels across the working table, and then enters into another axial central hole of a main shaft of said another wire traveling device and is rewound on a wire spool of said another wire traveling device on the other side of the working table.

3. The machine as claimed in claim 1, wherein said wire arranging means further includes a drum installed on and rotating with said main shaft, guide wheels mounted on said drum over which said wire passes, a linking board sleeved on said main shaft, said wire spool being axially movable along with said linking board on said main shaft; and said speed transformation means includes a long gear installed on and rotating with said main shaft, a first middle gear engaged with said long gear, a second middle gear connected with said first middle gear via a small shaft, a driven gear engaged with said second middle gear and connected with said wire spool for driving said wire spool to rotate around said main shaft.

4. The machine as claimed in claim 1, wherein said wire arranging means further includes a drum installed on and rotating with said main shaft, guide wheels mounted on said drum over which said wire passes, said wire spool being axially movable on said main shaft; and said speed transformation means includes a driving gear installed on and rotating with said main shaft, a first middle gear engaged with said driving gear, a second middle gear connected with said first middle gear via a bridge shaft, a driven gear sleeved on said main shaft and engaged with said second middle gear, said driven gear connected with said wire spool via bolts and driving said wire spool to rotate around said main shaft.

5. The machine as claimed in claim 1, wherein said wire arranging means further includes a drum installed on and rotating with said main shaft, guide wheels mounted on said drum over which said wire passes, bearings and their sleeve guides mounted on said drum, said wire spool being axially movable on said main shaft such that said wire released from said wire spool passes over the guide wheels on an upper part of said drum, comes out from an axial central hole in one end of said main shaft, travels across said working table, passes through said bearings and their sleeve guides to change its traveling direction, and then enters into another axial central hole in the other end of said main shaft, passing over the guide wheels in an lower part of said drum and being rewound on said wire spool; and said speed transformation means includes a driving gear installed on and rotating with said main shaft, a first middle gear engaged with said driving gear, a second middle gear connected with said first middle gear via a bridge shaft, a driven gear sleeved on said main shaft and engaged with said second middle gear, said driven gear connected with said wire spool via bolts for driving said wires, spool to rotate around said main shaft.

6. The machine as claimed in claim 1, wherein said main shaft, said wire arranging means including said wire spool, and said electrode wire are all driven by a single electric motor, and reciprocating linear movement of said wire is achieved by changing the rotation direction of said motor.

* * * * *